No. 719,723. PATENTED FEB. 3, 1903.
J. E. BEEBE.
GARDEN TOOL.
APPLICATION FILED MAY 28, 1902.
NO MODEL.
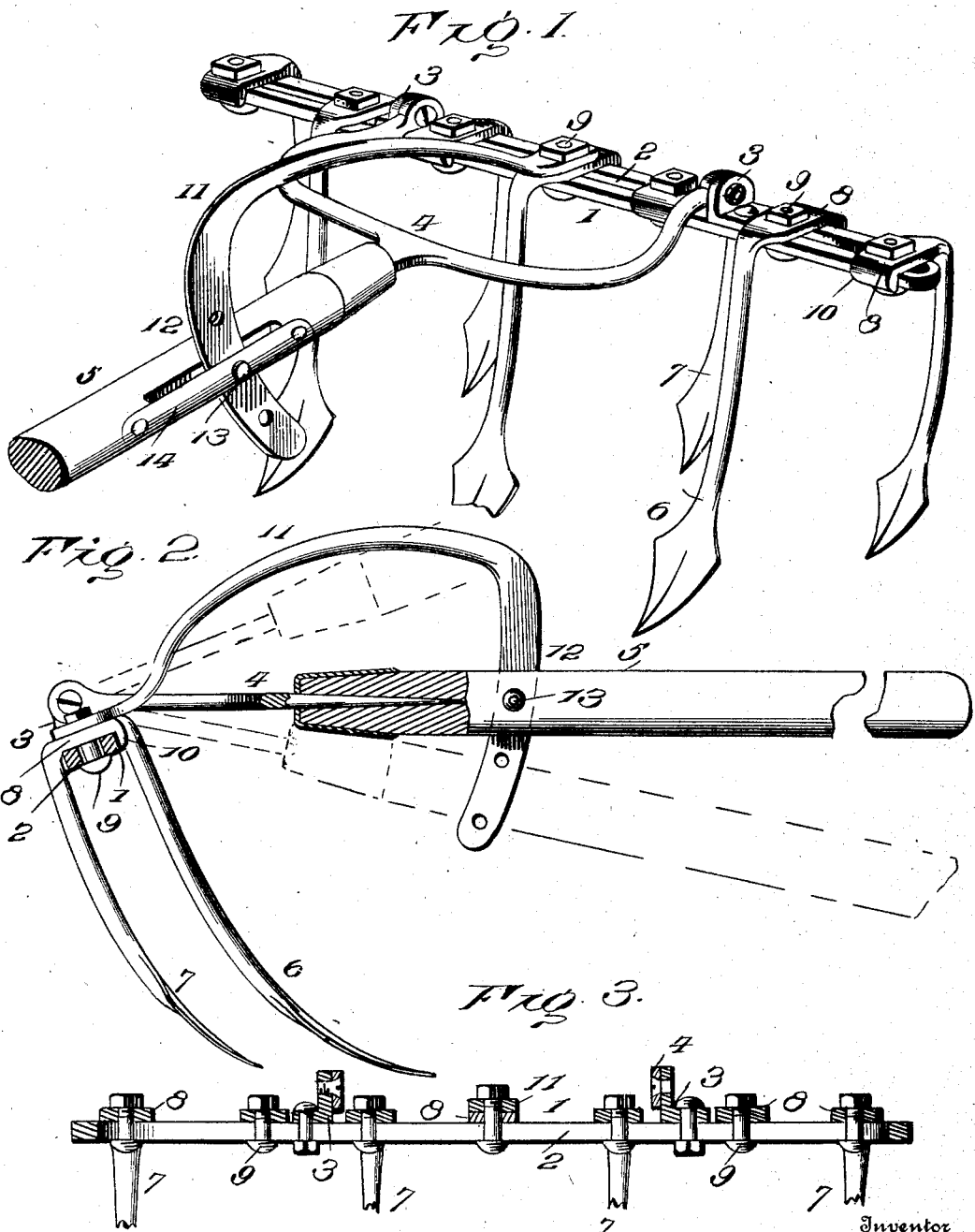

UNITED STATES PATENT OFFICE.

JOSEPH E. BEEBE, OF HARLAN, IOWA.

GARDEN-TOOL.

SPECIFICATION forming part of Letters Patent No. 719,723, dated February 3, 1903.

Application filed May 28, 1902. Serial No. 109,335. (No model.)

*To all whom it may concern:*

Be it known that I, JOSEPH E. BEEBE, a citizen of the United States, residing at Harlan, in the county of Shelby and State of Iowa, have invented certain new and useful Improvements in Garden-Tools; and I do hereby declare the following to be a full, clear, and exact description of the invention, such as will enable others skilled in the art to which it appertains to make and use the same.

The purpose of this invention is the provision of an implement of novel construction for use in agricultural pursuits, the device being designed most especially for hand use in gardening operations, the tool being of such construction as to combine all the advantages of a rake, hoe, and cultivator.

For a full description of the invention and the merits thereof and also to acquire a knowledge of the details of construction of the means for effecting the result reference is to be had to the following description and drawings hereto attached.

While the essential and characteristic features of the invention are susceptible of modification, still the preferred embodiment of the invention is illustrated in the accompanying drawings, in which—

Figure 1 is a perspective view of a garden tool or implement embodying the essential features of the invention. Fig. 2 is a side view, the head or toothed bar being in section and the handle being shown in an adjusted position by dotted lines. Fig. 3 is a central longitudinal section.

Corresponding and like parts are referred to in the following description and indicated in all the views of the drawings by the same reference characters.

The head or toothed bar 1 may be of any length, depending upon the size of the tool, and is longitudinally slotted, as shown at 2. This head or toothed bar may be formed of a single piece or of independent bars disposed in parallel relation and spaced apart the required distance and firmly connected at desired points. Bracket-lugs 3 are bolted or otherwise secured to the head or toothed bar 1, and the forked tang 4 of the handle 5 has its forked members pivoted thereto, so as to admit of pivotal adjustment between the handle and head to allow for convenient elevation of the handle and proper pitch or set of the teeth. The handle 5, of wood, has the forked tang 4 secured thereto in any way. The teeth are provided in two sets, designated as the front set 6 and the rear set 7, the latter being smaller and shorter than the former, this being found to give the best results. The shanks of the teeth are bent, as shown at 8, to extend over the head or toothed bar 1 and are apertured to receive the bolts or fastenings 9 for securing the teeth in an adjusted position upon the part 1. The terminal portions of the bent ends 8 are bent downward, so as to engage with the opposite edge of the head or toothed bar 1 from that adjacent to the shank, whereby the head or toothed bar 1 is embraced between the shanks of the teeth and the downwardly-bent terminal portions 10. The bolts or fastenings 9 pass through the slot 2 and when loosened admit of adjustment of the teeth upon the head or toothed bar, so as to space them any required distance apart. The front set of teeth 6 have their shanks arranged forward of the head or toothed bar, and the rear set 7 have their shanks located back of the said head, their bent ends 8 extending forward, whereas the bent ends of the front set project rearward. The teeth 9 are longer than the teeth 7, so as to admit of giving the handle 5 a slant when using the tool and admit of both sets of teeth coming in contact with the ground, so as to perform effective work. The rear set of teeth alternate with the front teeth—that is, come opposite the spaces formed between said front teeth—thereby insuring contact of the implement with every portion of the ground within its scope or track.

A rod or bar 11 is firmly attached at the rear end to the head or toothed bar 1 and curves upwardly and forwardly, and its front portion is bent downward, as shown at 12, to make adjustable connection with the handle 5 to admit of varying the elevation of the front end thereof without changing the pitch or inclination of the teeth or to admit of varying the pitch of the teeth without changing the elevation of the front end of the handle. The downwardly-bent end 12 of the rod 11 is provided with a series of openings any one of which is adapted to receive a pin 13, passed through corresponding openings in the handle 5, and a plate 14, covering a recess formed in the side of the handle for the reception of the part 12. The rear portion of the rod 11 is transversely widened and apertured to receive the bolt or fastening employed for attaching the center tooth to the head or bar 1, thereby obviating the necessity of extra means for securing the rod 11 to the head or toothed bar of the implement.

By proper adjustment of the teeth the implement may be used in the capacity of a hoe, a rake, or a cultivator, and the pitch of the teeth or the inclination of the handle may be varied by adjustably connecting the bent end 12 of the rod 11 with the handle in the manner set forth.

Having thus described the invention, what is claimed as new is—

1. In an agricultural implement, a longitudinally-slotted head or toothed bar, teeth having the end portions of their shanks bent to overlap the said head or toothed bar and the terminal portions rebent so as to embrace the said head or toothed bar between the said terminal portions and the shanks, and fastenings passed through the slot of the head or toothed bar and the openings in the bent end portions of the shanks overlapping the said head for securing the teeth to the head or toothed bar in an adjusted position, substantially as set forth.

2. In combination, a slotted head or toothed bar, a front set of teeth having the upper ends of their shanks bent rearward and downward to overlap and embrace the front and rear edges of the said head, a rear set of teeth alternating the front teeth and having the upper ends of their shanks bent forward and downward to overlap and embrace the front and rear edges of said head, and fastenings for securing the teeth to the head in an adjusted position, substantially as set forth.

3. In combination, a head or bar provided with teeth, a handle having pivotal connection with the said head, a rod rigidly connected to the head and curved upwardly and forwardly and having its front portion bent downwardly, and means for adjustably connecting the bent end of said rod with the handle, substantially as and for the purpose set forth.

In testimony whereof I affix my signature in presence of two witnesses.

JOSEPH E. BEEBE. [L. S.]

Witnesses:
W. M. PRATT,
G. M. HUBBELL.